July 9, 1946.  D. M. McBEAN  2,403,871
METHOD OF BLANCHING FOOD PRODUCTS
Filed Oct. 5, 1942  2 Sheets-Sheet 1
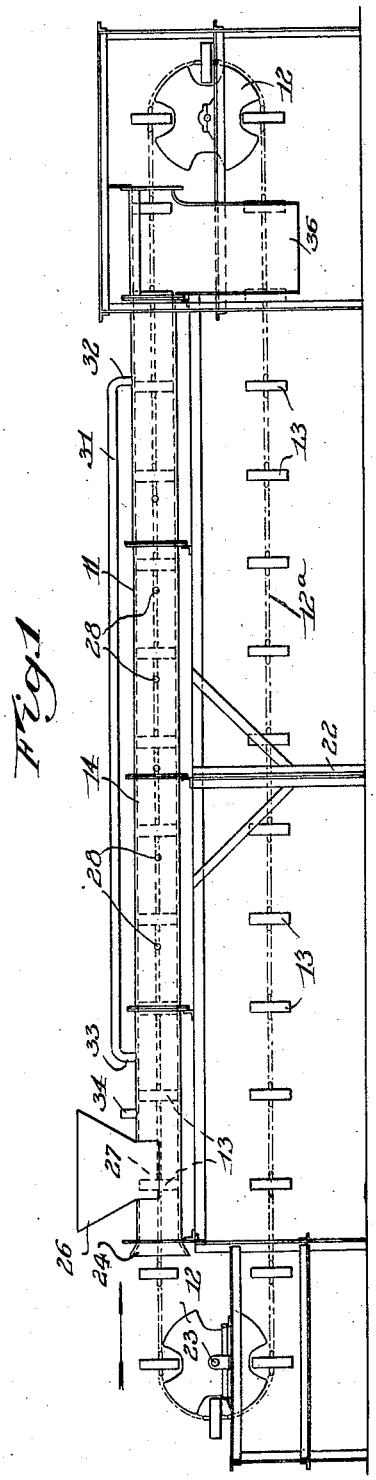
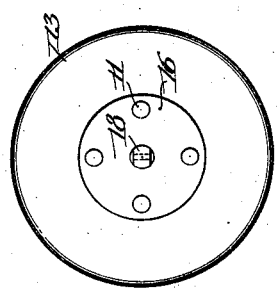
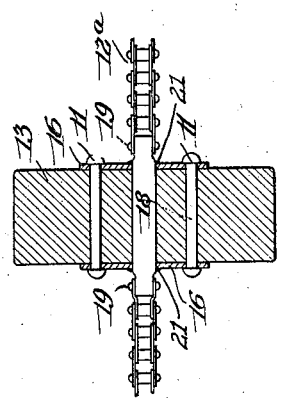
INVENTOR.
Douglas M. McBean
BY
his Attorney July 9, 1946.　　　D. M. McBEAN　　　2,403,871
METHOD OF BLANCHING FOOD PRODUCTS
Filed Oct. 5, 1942　　　2 Sheets-Sheet 2
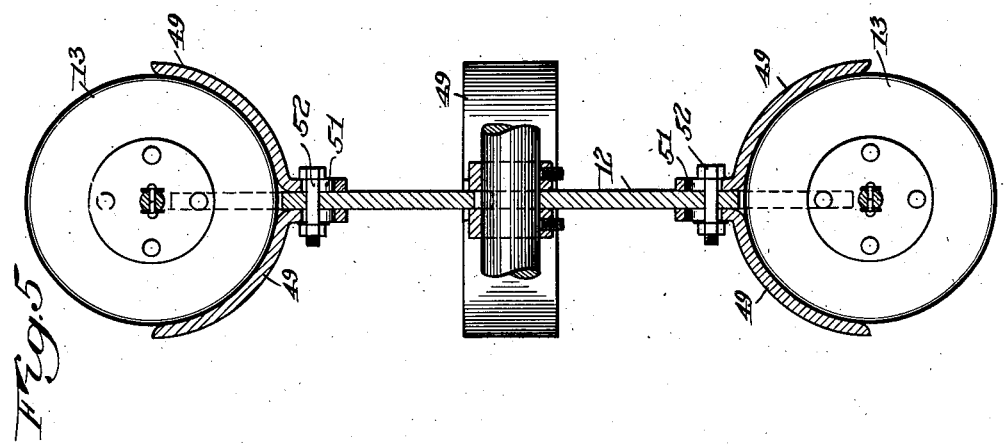
INVENTOR.
Douglas M. McBean
BY
his Attorney Patented July 9, 1946

2,403,871

UNITED STATES PATENT OFFICE 2,403,871

METHOD OF BLANCHING FOOD PRODUCTS

Douglas M. McBean, Rochester, N. Y.

Application October 5, 1942, Serial No. 460,918

10 Claims. (Cl. 99—103)

My invention relates to a method and apparatus for blanching food products. The method and apparatus of my invention may be employed in any of the conventional processes of food preservation, such as canning, freezing or dehydration.

An object of my invention is the provision of an improved process of blanching and an apparatus for carrying out said process, wherein the temperature at which the edibles, such as fruits, vegetables, meats and fish, are blanched and the time during which such blanching occurs may be more accurately controlled.

Another object of my invention is to provide an improved process of blanching, wherein the edibles are maintained in constant positive motion while being subjected to heat and pressure.

Another object of my invention is the provision of a process of blanching in which the edibles are blanched in segregated batches in a manner such that all portions of the vegetables are uniformly treated, the process being carried out in a continuous manner with the edibles and the heating medium being positively maintained in motion during the blanching cycle.

A further object of my invention is to provide a continuous process of blanching wherein successive batches of edibles are segregated and separately treated by the direct action of steam and while maintained in continuous motion, the steam being preferably under pressure and the pressure being gradually reduced toward the end of the blanching process.

Still another object of my invention is the provision of a method of continuous blanching and an apparatus for carrying out said method wherein the food product is heated under pressure in relatively small pressure vessels or retorts each segregated from the other to the end that the blanching medium may more readily and more uniformly permeate the product and so that cold spots and improperly blanched portions of the food product are avoided.

My invention further has for an object the provision of a method of continuous blanching and an apparatus for carrying out said method wherein exhaust steam or steam which has already been used for blanching may be employed to flush or blow air out of the pressure vessel or retort into which the unblanched food product is charged.

My invention further contemplates the provision of apparatus adapted to carry out my novel process of blanching wherein the food may be blanched in segregated batches in separate compartments by steam under pressure with conveying means being provided to maintain the compartments, including the edibles and the steam, continuously in motion from a charging point to a discharging point.

Other objects and advantages of my invention will be set forth in the claims and will be apparent from the following description, when taken in connection with the accompanying drawings, in which:

Fig. 1 is a side elevation of the apparatus of my invention;

Fig. 2 is a partial sectional view of the piston and connecting chain assembly;

Fig. 3 is a face view of one of the pistons;

Fig. 4 is a face view of one of the sprockets for driving the chain assembly;

Fig. 5 is a sectional view taken substantially on the line 4—4 of Fig. 5; and

Fig. 6 is a view similar to Fig. 4 showing a modified form of the piston and chain assembly of my invention.

In the preservation of most food products by canning, freezing, or dehydration, it is necessary to inactivate the peroxidase and catalase systems of the food product. In this conventional enzyme inactivation process, which is known as blanching, it is customary to heat the edibles to a predetermined temperature for a predetermined period of time by the use of steam or hot water. The accurate control of the tempertaure time relationship is extremely important in order that the enzymes may be thoroughly inactivated without injuring the edible as a food. Within reasonable temperature limits the blanching temperature may be increased, but in such case the time should be decreased to prevent the destruction or loss of valuable food properties of the edibles.

Moreover, it has been generally found desirable by those skilled in the art that it is of advantage to quickly inactivate the enzymes by employing higher temperatures and a shorter blanching time. The temperature and time variations which are permissible are well known in the art to which this invention applies and vary somewhat with the species of food product being blanched and the size of the pieces.

The advantages of continuous process over batch processes of blanching have also been recognized. The continuous process not only requires less steam or hot water, but also effects a tremendous saving in labor and equipment in the handling of the food prdouct. A further important advantage of the continuous process of blanching is that the temperature of the product can be quickly raised sufficiently to inactivate the enzymes by placing the continuous blanching equipment in close proximity with the slicing, dicing, or other cutting machines. Thus it is possible to bring material to blanching temperature perhaps within a minute after cutting. In the batch process of blanching the mechanical operations necessary to charge the pressure vessel or retort cause an appreciable time lapse between the cutting or dicing operation and the blanching operation. The time interval between cutting and blanching is important for the reason that after cutting there is a very rapid loss from the vegetable or other food product of ascorbic acid and other essential vitamins.

Insofar as I am aware, the present continuous processes of blanching do not enable the desired accurate control of the temperature time relationship with respect to each particle or portion of the edible being blanched. Where a large volume of the food product is exposed to the blanching medium uniformity of blanching, between different portions of the mass, is difficult to obtain. I have found that more acurate control of the temperature time relationship may be obtained, while still carrying the process out in a continuous manner, if the edibles are blanched in small segregated batches in separate pressure vessels or retorts, with the batches being moved continuously at a predetermined rate of speed predetermined in accordance with the temperature of the heating medium. Moreover, in such a system of pressure blanching I provide means gradually to reduce the pressure on the edibles near the end of the blanching cycle and also provide means enabling the use of exhaust steam for driving as much air as possible away from contact with the edibles.

For the purpose of carrying out the method of my invention I have shown in Fig. 1, in a somewhat diagrammatic manner, an apparatus suitable for this purpose which comprises a cylindrical or other shaped tube 11 through which a chain or other continuous belt 12a passes. The cylindrical tube 11 may be made in separate sections, as shown in the drawings, or may be made in one piece and is preferably of a length sufficient to carry out the complete blanching process while the edibles are carried through the tube. The chain 12a is mounted on suitable sprockets 12, one of which may be driven by any suitable prime mover (not shown). Preferably the chain conveyor is driven by a prime mover the speed of which may be varied so that the time of blanching may be accurately controlled and regulated.

Mounted on the chain conveyer is a series of spaced pistons 13 which are of a diameter such as to fit snugly the internal diameter of the tube 11. The pistons are adapted to form the end walls of a series of compartments, indicated by the numeral 14. The end walls and the inner wall of the tube form segregated blanching chambers or pressure vessels for the reception of the food products. The amount of food product each blanching chamber will carry is dependent upon its size and the speed of the conveyer. For different food products it may be desirable to vary the size of the blanching chambers so as to increase or decrease the size of the batches.

The pistons 13, as shown most clearly in Fig. 2, may be made of wood reenforced by suitable facing plates 16 through which extend rivets 17. Each of the pistons is provided with a central bore through which a connecting link 18 extends. The connecting link 18 is pivoted adjacent its ends, as indicated at 19, to links of the chain to form a continuous assembly. For purposes which will appear later the length of the connecting link from pivot to pivot is a multiple of the pitch of the chain. In the particular illustration shown a ratio of six to one is employed, although it will be apparent that this may be varied.

For the purpose of preventing leakage between the external diameter of the connecting link and the bore of the piston, a seal 21 is provided at one or both ends of the connecting link 18. In the chain and piston assembly, illustrated in the drawings, I have shown a single connecting link passing axially of the piston. With some vegetables as, for example, sauerkraut, it may be desirable to employ two chains with two connecting links extending through the pistons. If two connecting links and chains are employed they are spaced so that the connecting links extend through the pistons adjacent the peripheries thereof. This arrangement minimizes the wrapping of the sauerkraut around the chain.

The tube 11 may be supported in any suitable manner, as by a frame structure 22 upon which the bearings or supports 23 for the sprockets may also be mounted. The tube, at its entrance opening, has a tapered mouth piece 24 adapted to guide the pistons and properly center them with respect to the tube as they successively enter the tube. Adjacent the entrance end of the tube is a hopper 26 which has a free opening 27 into the tube.

The usual practice in blanching is to first wash the edibles and then slice, dice, or otherwise cut up, for example, the vegetables into small pieces so that the heating medium may more readily penetrate to the center of the pieces for the purpose of thoroughly inactivating the enzymes. After the edibles have been thus prepared they are preferably immediately dumped into the hopper and as the conveyer moves, each piston or pressure vessel picks up a charge or batch of edibles and carries such batch along the tube. Since each compartment is substantially sealed by the pistons from its adjacent compartment, there is a minimum loss of heating medium and also each batch of edibles is segregated and separately treated. With this arrangement more accurate control of the temperature to which each particle is heated may be maintained and cold spots and inadequately blanched portions of the mass are avoided.

Extending through the walls of the tube are a series of openings 28 through which steam may be introduced. Any desired number of steam openings may be employed depending upon conditions. Although steam is the preferred blanching medium, it might be possible to use the apparatus of my invention with a hot water blanching medium. I have found that better heat transfer to the edibles being blanched may be obtained when the edibles are subjected to the direct contact of the heating medium. An important aspect of the invention is that the product being blanched and the heating medium are in positive motion which facilitates circulation of the steam between the pieces of material and tends to produce a uniformity in the temperature to which each particle of food is heated.

The preferred temperature range for carrying out the blanching process is from approximately 206° F. to 220° F. The higher the temperature the more rapid the chemical reaction resulting in enzyme inactivation, and with my method and apparatus for blanching high temperatures and pressures are possible. If the vegetables or other food products are heated to 206° F. about six minutes is usually required for the blanching process, while if the vegetables are heated to 220° F. from two to three minutes is required for blanching. This temperature time relationship will, of course, vary for different food products as is well known in the art. To heat the vegetables to the above temperatures somewhat higher steam temperatures are required. While a uniform temperature and pressure of steam may be employed substantially throughout the blanching process, the pressure should be dropped near the end of the cycle to prevent the cells of the vegetables from disintegrating as a result of the explosive action of moisture in the cells caused by a sudden drop in pressure. This is accomplished by means which will be presently described.

Instead of employing a uniform temperature and pressure substantially throughout the blanching cycle, I have found in some cases that it is preferable to gradually increase the temperature and pressure at the beginning of the blanching cycle and then gradually decrease the temperature and pressure toward the end of the cycle. It will be appreciated that such variations in the temperature require adjustments of the speed of the conveyer so as to adjust the blanching time to the temperature. For example, it might be desirable to introduce steam through the first opening 28 at one pound pressure, at a temperature corresponding to that pressure, and through the second opening 28 at two pounds pressure at a temperature corresponding to that pressure, thus gradually increasing the pressure until the maximum pressure desired is reached. Similarly the pressure and temperature may be reduced in steps toward the end of the cycle. While a steam pressure of four pounds is usually sufficient, with some edibles it may be desirable to use steam pressures as high as twenty pounds and a steam temperature corresponding to that pressure.

One of the important features of my invention is the means provided for gradually reducing the pressure on the edibles so as to prevent the cells thereof from "exploding" as a result of too rapid a drop in pressure. Such means comprises a by-pass 31 which has access, as indicated at 32, to the tube. As the compartments successively are brought into communication with the by-pass, steam may flow through the by-pass to gradually reduce the pressure in the compartment in communication with the by-pass. The gradual reduction in the pressure is accomplished by reason of the fact that there is a resistance to flow of steam through the by-pass, which is effective to control and prevent the rapid fluctuation in pressure and instead gradually reduce the same.

The by-pass 31 is extended toward the entrance end of the tube where it communicates therewith, as shown at 33. I have found it extremely desirable to drive off as much air from contact with the edibles as possible. The air to some extent insulates the vegetables. Better heat transfer and penetration of the edibles is obtained if the amount of air in the compartments is reduced to a minimum. Moreover, the presence of air and other non-condensable gases in the blanching chambers reduces the temperature therein for a given steam pressure. By thoroughly flushing out the blanching chambers with exhaust steam, the temperature gradient between the live steam supplied through the openings 28 and the desired temperature of the food product, is reduced to a minimum. Thus steam, which would normally be wasted, flows through the by-pass 31, enters the compartments successively and drives or flushes the air out through a vent 34. It will be noted that the by-pass enters the tube 33 and the vent 34 is located so that the following piston passes the right hand edge of the hopper before both the by-pass and the vent 34 have access to the compartment adjacent thereto. When the edibles reach the end of the tube they are discharged through a discharge opening 36 and may be picked up by a conveyer (not shown) which may be located beneath the discharge opening 36.

As previously mentioned, the connecting links 18 are, in length, a multiple of the pitch of the chain. To enable the chain, together with the pistons, properly to pass around the sprockets and be driven thereby, a novel sprocket construction is employed, clearly shown in Figs. 4 and 5. Each sprocket comprises a plate 41 having teeth 42 adapted to enter the openings in the chain for the purpose of driving the same. Spaced around the periphery of the sprocket are a plurality of cut-outs 43. The number of cut-outs employed may be varied, but in the example shown four cut-outs are provided. The distance around the sprocket from the center of one cut-out to the center of the next, corresponds to the center line distance between the pistons. To permit the pistons properly to register with the cut-outs as the sprockets are rotated to move the chain, the cut-outs are provided with entrance and exit curves 44 and 46.

It will be appreciated, when a piston lies in one of the cut-outs, that the piston and the connecting links of the adjacent portions of the chain tend to assume a chordal position or to sag below the circle defined by the radius of the sprocket. Thus the piston, together with its associated chain, attempts to lie along the shorter distance between, for example, the points 47 and 48 of the sprocket. This interferes with the proper meshing of the teeth of the sprocket with the openings in the links of the chain and may result in improper mating and jamming. For the purpose of preventing this, on each side of the sprocket adjacent each of the cut-outs there is provided a plate 49. The plates 49 form together a semi-circular support in which a piston may lie. That is, the radius of the semi-circle formed by the plates 49 corresponds substantially to the radius of the piston.

The plates 49 are secured to the sprocket by means of nut and bolt assemblies 51 which extend through openings in the sprocket and through elongated openings or slots 52 in the plates 49. Thus the plates may be adjusted radially with respect to the sprocket. By proper adjustment the pistons may be supported in an outward position so that in the position of support the combined length of chain from the point 47 to the connecting link pivot, the length of the connecting link, and the length of the chain from the other end of the connecting link pivot to the point 48 is substantially equal to the distance across the cut-out along the arc of the circle whose radius is the radius of the sprocket. Thus the piston and the adjacent links of the chain are prevented from assuming a substantially chordal or sagging position from the points 47 and 48 and proper meshing of the teeth of the sprocket with the chain is obtained.

This proper mating of the teeth of the sprocket with the openings in the links of the chain may also be obtained (instead of in the manner described above) by shortening the length of the connecting link, as illustrated in Fig. 6. In this method, the chordal distance across the cut-outs is measured and the length of the connecting link 18 is made such that the connecting link, together with the adjacent chain links, will assume a chordal portion across from the point 47 to the point 48.

While I have described my novel process of blanching and have shown a novel apparatus suitable for carrying out said process, it will be appreciated that various changes and modifications may be made therein, particularly in the form and relation of parts, without departing from the spirit of my invention as set forth in the appended claims.

I claim:

1. A method of blanching edibles which comprises forming a series of closed chambers adapted to contain the edibles being blanched, admitting a heating medium to said closed chambers, and continuously moving said closed chambers together with the edibles.

2. A method of blanching edibles which comprises forming a series of closed chambers adapted to contain the edibles being blanched, admitting a heating medium of a blanching temperature under pressure to said closed chambers, and continuously moving said closed chambers together with the edibles.

3. A method of blanching edibles which comprises forming a series of closed chambers adapted to contain the edibles being blanched, admitting a heating medium to said closed chambers, and continuously and positively moving said closed chambers together with the heating medium and the edibles.

4. A method of blanching edibles which comprises forming a series of closed chambers adapted to contain the edibles being blanched, substantially sealing said chambers against communication between them, admitting a heating medium to said closed chambers, and continuously moving the edibles.

5. A method of blanching edibles which comprises forming a series of closed chambers adapted to contain the edibles being blanched, substantially sealing said chambers against communication between them, admitting a heating medium at a blanching temperature in a gaseous form and under pressure to said closed chambers, and continuously moving said closed chambers together with the edibles and the heating medium.

6. A method of blanching edibles which comprises moving said edibles through a blanching cycle, subjecting said edibles to a heating medium at blanching temperature and under pressure as the edibles are continuously moved, and gradually reducing said pressure toward the end of said blanching cycle.

7. A method of blanching edibles which comprises moving said edibles through a blanching cycle, subjecting said edibles to a steam heating medium at blanching temperature and under pressure as the edibles are continuously moved, and gradually reducing said pressure toward the end of said blanching cycle.

8. A method of blanching edibles which comprises moving said edibles through a blanching cycle, subjecting said edibles to a steam heating medium at blanching temperature, and subjecting said edibles to a gradually increasing pressure at the beginning of said blanching cycle and a gradually decreasing pressure toward the end of said blanching cycle.

9. A method of treating a food product which comprises forming a series of closed chambers adapted to contain the food product, directing a fluid heating medium under pressure into said closed chambers and into contact with the product, and continuously moving said closed chambers together with the food product.

10. A method of treating a food product which comprises forming a series of closed chambers adapted to contain the food product, directing a fluid heating medium under pressure into said closed chambers and into contact with the product, and continuously and positively moving said closed chambers together with the food product from a chamber charging point to a chamber discharging point.

DOUGLAS M. McBEAN.